(12) United States Patent
Sprague et al.

(10) Patent No.: US 7,862,256 B2
(45) Date of Patent: Jan. 4, 2011

(54) PIPELINE WEIGHTING DEVICE AND METHOD

(75) Inventors: Ian Sprague, Sherwood Park (CA); Charles Frederick McKay, Edmonton (CA)

(73) Assignee: CRC-Evans Canada Ltd., Edmonton (CA)

( * ) Notice: Subject to any disclaimer, the term of this patent is extended or adjusted under 35 U.S.C. 154(b) by 378 days.

(21) Appl. No.: 11/840,089

(22) Filed: Aug. 16, 2007

(65) Prior Publication Data

US 2009/0047073 A1    Feb. 19, 2009

(51) Int. Cl.
*F16L 1/06* (2006.01)
(52) U.S. Cl. .................. 405/184.4; 405/171; 405/172
(58) Field of Classification Search .......... 405/171, 405/172, 184.4, 115, 186
See application file for complete search history.

(56) References Cited

U.S. PATENT DOCUMENTS

| | | | |
|---|---|---|---|
| 172,039 | A | 1/1876 | Lazarevitch |
| 2,147,970 | A | 2/1939 | Du Bios |
| 2,662,552 | A | 12/1953 | Rowe et al. |
| 3,130,897 | A | 4/1964 | Poklukar et al. |
| 3,191,850 | A | 6/1965 | Niemeyer |
| 3,235,169 | A | 2/1966 | Gennerich et al. |
| 3,261,267 | A | 7/1966 | Becker |
| 3,779,027 | A | 12/1973 | Murphy |
| 3,793,845 | A | 2/1974 | Keith |
| 3,957,098 | A | 5/1976 | Hepworth et al. |
| 4,102,137 | A | 7/1978 | Porraz et al. |

(Continued)

FOREIGN PATENT DOCUMENTS

CA    579525    7/1959

(Continued)

OTHER PUBLICATIONS

Excerpt from Allan Edwards, Inc. website <http://www.allanedwards.com/soft_geotextile_weights.php> Accessed: May 14, 2007.

(Continued)

*Primary Examiner*—David J Bagnell
*Assistant Examiner*—Sean D Andrish
(74) *Attorney, Agent, or Firm*—Greenlee Sullivan P.C.

(57) ABSTRACT

A pipeline weighting device to straddle the longitudinal axis of a pipeline, a method of filling the device, and a method of weighting a pipeline with the device. The pipeline weighting device is formed of a plurality of interconnected, generally tubular-shaped lobes arranged to straddle the pipeline in a balanced manner along the longitudinal axis of the pipeline. The lobes are formed of a flexible, water permeable fabric to hold weighting fill material. Each lobe has opposed and closed longitudinal side edges and opposed ends, one end being a closed end, and the other end forming an open or partially open filling end. Each lobe is formed with a self-closing filling sleeve or filling flap at the open filling end, the filling sleeve or filling flap extending into the interior of the lobe and providing an opening into the lobe in a manner such that, when each of the lobes is fully charged through the opening with the fill material, and the pipeline weighting device is turned on its longitudinal axis, the filling sleeve or tube becomes trapped to close the filling sleeve or filling flap and to contain the fill material.

30 Claims, 5 Drawing Sheets

U.S. PATENT DOCUMENTS

| | | | |
|---|---|---|---|
| 4,166,710 | A | 9/1979 | Spiridonov |
| 4,316,574 | A | 2/1982 | Lepisto |
| 4,387,749 | A | 6/1983 | Donisi |
| 4,477,206 | A | 10/1984 | Papetti et al. |
| 4,759,641 | A | 7/1988 | Jacobs |
| 5,385,430 | A | 1/1995 | Connors |
| 5,443,329 | A | 8/1995 | de Geeter |
| 5,603,588 | A | 2/1997 | Herbert |
| 6,186,701 | B1 | 2/2001 | Kempers |
| 6,220,788 | B1 * | 4/2001 | Jewell ............... 405/172 |
| 6,499,879 | B2 | 12/2002 | Schneck |
| 6,595,688 | B2 | 7/2003 | Schneck |
| 6,598,374 | B1 | 7/2003 | Ensor |
| 6,619,884 | B2 * | 9/2003 | Davis et al. ............ 405/111 |
| 6,890,290 | B2 | 5/2005 | Pansier et al. |
| 6,997,858 | B1 | 2/2006 | Moravek |
| 7,029,205 | B2 | 4/2006 | Daigle |
| 2004/0258508 | A1 | 12/2004 | Jewell |
| 2006/0198705 | A1 | 9/2006 | Willis et al. |

FOREIGN PATENT DOCUMENTS

| | | |
|---|---|---|
| CA | 1021952 A1 | 12/1977 |
| CA | 2158801 C | 7/1998 |
| CA | 2075006 C | 7/2002 |
| CA | 2277523 C | 2/2004 |
| CA | 2488145 AA | 5/2006 |
| CA | 2527790 AA | 5/2006 |
| CA | 2431281 C | 6/2006 |
| FR | 2716251 A1 | 8/1995 |

OTHER PUBLICATIONS

Excerpt from Key-May Industries Ltd. website <http://www.keymay.com/keybag.htm> Accessed: Sep. 19, 2006.

Excerpt from Sea-Struct Pty Ltd. Website <http://www.sea-struct.com.au/stab.htm> Accessed: Sep. 6, 2002.

International Search Report and Written Opinion, Corresponding to International Application No. PCT/CA2008/001401, Mailed Oct. 21, 2008.

* cited by examiner

PIPELINE WEIGHTING DEVICE AND METHOD

FIELD OF THE INVENTION

This invention relates to a pipeline weighting device a method of filling such a device with weighting fill material, and a method of weighting a pipeline with such a device.

BACKGROUND OF THE INVENTION

Pipelines transporting liquid or gaseous materials often extend through areas where the pipeline needs to be weighted to avoid having the pipeline being lifted or heaved by buoyant forces or frost. Such areas include, for example, underwater, marsh, muskeg, and other unconsolidated environments. A trench is typically formed, the pipeline is installed in the trench, and sections of the pipeline are anchored, coated, or weighted with concrete, clamp on weights, or bag weights filled with weighting fill material. The weighted or anchored pipeline must thereafter resist hydrostatic forces of flooding, or freeze-thaw cycles.

Early pipeline weights included simple or complex concrete or concrete-containing devices which could be placed on or strapped around the pipeline. Exemplary patents include U.S. Pat. No. 2,662,552, issued Dec. 15, 1953 to Rowe et al.; Canadian Patent 1,021,952 issued Dec. 6, 1977 to Bunn; U.S. Pat. No. 4,166,710, issued Sep. 4, 1979 to Spiridonov; Canadian Patent 1,021,952 issued Dec. 6, 1977 to Bunn; Canadian Patent 2,158,801 issued Jul. 14, 1998 to Key-May Industries Ltd.; French Patent Application No. 2,716,251 A1 of Bouygues Offshore Société, published Aug. 18, 1995; and U.S. Pat. No. 5,443,329 issued Aug. 22, 1995 to Spuncon Pty. Ltd. and Marecon Pty.

Bag weights for pipeline weighting have been more recently used. They are advantageous in that they can be filled with inexpensive weighting fill materials such as sand and gravel at remote locations during pipeline installation. The bag weights limit damage to a pipeline protective coating. Exemplary patents include U.S. Pat. No. 3,793,845 issued Feb. 26, 1974 to Keith; Canadian Patent 2,075,006, issued Jul. 16, 2002, to Connors; Canadian Patent 2,277,523 issued Feb. 17, 2004, to Jewell; and Canadian Patent Application 2,527,790 published May 22, 2006 to Tiger Ridge Resources Ltd.

Several of the bag weights of the above patents present problems in the filling and installation operations. The bag weights, once filled, may be very large and heavy, for example in excess of 10,000 pounds. The Connors' device has side saddle bags that are open along its upper longitudinal edges, making spillage of the fill material problematic. As well, these open bags allow water to enter the bag, causing the bag contents to freeze in cold climates where these bags are often used. Installation of frozen bags is problematic, both in terms of awkward handling, and pipe damage. The Connors' device has been altered from that shown in the patent to include drawstrings, partial stitching or flaps to close or partially close these upper edges. These efforts have complicated both the manufacturing of the bags, and the filling and installation process, without fully addressing the problems of spillage and freezing. The Jewell device requires a difficult under the pipeline strapping and cinching operation to fix the bag weights onto the pipeline. Since the bag weights are placed over the pipeline in the close confines of a trench, the strapping operation can be difficult and dangerous for workers, particularly for very large bags which hang well below the pipe. Both the Connors' and Jewell devices cause difficulties with the large bag sizes, since the bag, to provide the needed weight, enlarge both the depth and width dimensions of the weighted pipeline. This in turn increases the depth and size of the trench that is needed to accommodate the weighted pipeline.

The Tiger Ridge device uses a circumferential cinch that requires workers to wrap a strap more than one circumferential distance around the bag and pipeline, which can be a difficult operation in the confines of the pipeline trench. As noted above, large bag weights that extend either too far above, or too far below the pipeline require the trench to be excavated to depths that may be uneconomical. The Tiger Ridge device attempts to address this problem by filling with heavy barite material, however, barite material is not always readily available or available at low cost.

As well, the heavy bag weights are typically end filled by suspending the bag weight above ground from the open bag ends, and filling each bag from an overhead hopper (see for example Canadian Patent 2,431,281, issued Jun. 13, 2006 to Jewell). The bag ends must then be individually rolled over and tied to close the ends, a labor intensive process. As well, the ends can open after tying, spilling fill material.

A simple, inexpensive pipeline weighting device is still needed to address one or more of the above-noted problems.

SUMMARY OF THE INVENTION

Broadly stated, the present invention provides a pipeline weighting device to straddle the longitudinal axis of a pipeline. The device is formed of a plurality of interconnected, generally tubular-shaped lobes arranged to straddle the pipeline in a balanced manner along the longitudinal axis of the pipeline. The lobes are formed of a flexible, water permeable fabric to hold weighting fill material. Each lobe has an inner side wall, opposed and closed longitudinal side edges, and opposed ends, one end being a closed end, and the other end forming an open or partially open filling end. Each lobe is formed with a self-closing filling sleeve or filling flap at the open or partially open filling end, the filling sleeve or flap extending into the interior of the lobe and providing an opening into the lobe in a manner such that, when each of the lobes is fully charged through the opening with the fill material, and the pipeline weighting device is turned on its longitudinal axis, the filling sleeve or filling tube becomes trapped within the fill material to close the lobe and to contain the fill material.

Preferably, the filling sleeve or filling flap is fixed to an inner side wall of the lobe, such as by stitching, to prevent dislodgement by the fill material during charging.

In a preferred embodiment which includes the self-closing filling flap, the pipeline weighting device includes a pair of facing filling flaps extending into the interior of the lobe and have facing side edges which are fastened together along all or part of their length, for example by stitching. Preferably, the pair of facing filling flaps extends into the interior of adjacent lobes, such as two adjacent lobes, in order to fill the adjacent lobes in one filling operation.

The pipeline weighting device most preferably includes a filling sleeve which is fixed, for instance by stitching, to the inner side wall of the lobe to prevent dislodgement by the fill material during charging. The filling sleeve is preferably formed of the flexible, water permeable fabric and is contiguous with the lobe. The filling sleeve and extends into the interior of the lobe so as to form opposed open sleeve ends, one open sleeve end being an exterior open sleeve end at or adjacent the filling end of the lobe, and the other open sleeve end being an interior open sleeve end which forms the opening into the lobe. The filling sleeve has preferred dimensions such that it extends into the interior of the lobe by a distance which is greater than the opening at the interior open end of the filling sleeve.

In a preferred embodiment of the invention, the pipeline weighting device is formed such that one filling sleeve extends into the interior of adjacent lobes in order to fill the adjacent lobes in one filling operation. In this embodiment, one filling sleeve is formed between two adjacent lobes such that a portion of the filling sleeve extends into the interior of the adjacent lobes, and is partitioned to form interior open ends which open into each adjacent lobe. This is most efficiently achieved by forming the plurality of lobes from a web of the flexible, water permeable fabric, stitched along a longitudinal axis to form the plurality of lobes arranged in side by side relationship, with each of the plurality of lobes being generally equal in size, the closed side edges and closed ends of each lobe being formed by one or both of folding and stitching of the web. The filling sleeve is most preferably stitched to both fix the filling sleeve to the inner side wall of the lobe and to partition to form the interior open ends into the adjacent lobes. Most preferably, the filling sleeves are formed from the web to be integral with the lobes, and the filling sleeves are formed by stitching along all or part of their side edges, and folding into the interior of the lobes.

The pipeline weighting device preferably includes an even number of lobes to balance on the pipeline, with one filling sleeve arranged to fill each pair of adjacent lobes. Most preferably, four symmetrical lobes are formed, with one filling sleeve being provided for each two adjacent lobes.

Additional preferred features include first lifting loops connected at the filling end of the lobes, for lifting the weighting device during charging, and second lifting loops connected along the longitudinal side edges of one of the lobes, for lifting the filled weighting device into position to straddle the pipeline, first reinforcing straps stitched longitudinally along the stitching lines forming the lobes, and ending in loops which form the first lifting loops, second reinforcing straps stitched transversely across the lobes, and ending in loops which form the second lifting loops. Optionally, one or more fastening straps are connected to one or more of the lobes to hold the weighting device on the pipeline.

The pipeline weighting device is preferably formed from a single web of woven or non-woven geotextile fabric, most preferably woven polypropylene. The first and second reinforcing straps are preferably formed of a woven or non-woven geotextile strapping material, most preferably woven polypropylene strapping material.

The invention also broadly extends to a method of filling a pipeline weighting device with weighting fill material, comprising:

a) providing a pipeline weighting device comprising a plurality of interconnected, generally tubular-shaped lobes, each lobe having opposed and closed longitudinal side edges and opposed ends, one end being a closed end, and the other end forming an open or partially open filling end, the plurality of lobes being formed of a flexible, water permeable fabric to hold the weighting fill material, and each lobe being formed with a self-closing filling sleeve or filling flap at the open or partially open filling end, the filling sleeve or flap extending into the interior of the lobe and providing an opening into the lobe;

b) charging the plurality of lobes through the opening formed by the filling sleeves or filling flaps with the weighting fill material until each lobe includes a balanced, full charge of the weighting fill material; and c) turning the pipeline weighting device on its longitudinal axis to cause the filling sleeves or filling flaps to become trapped within the weighting fill material to thereby close the lobes and to contain the weighting fill material.

In yet another broad aspect, the invention extends to a method of weighting a pipeline along its longitudinal axis, comprising:

a) providing a pipeline weighting device comprising a plurality of interconnected, generally tubular-shaped lobes, each lobe having opposed and closed longitudinal side edges and opposed ends, one end being a closed end, and the other end forming an open or partially open filling end, the plurality of lobes being formed of a flexible, water permeable fabric to hold the weighting fill material, and each lobe being formed with a self-closing filling sleeve or filling flap at the open or partially open filling end, the filling sleeve or filling flap extending into the interior of the lobe and providing an opening into the lobe;

b) charging the plurality of lobes through the opening formed by the filling sleeves or filling flaps with the weighting fill material until each lobe includes a balanced, full charge of the weighting fill material;

c) lifting the pipeline weighting device and turning it on its longitudinal axis to cause the filling sleeve or filling flap to become trapped within the weighting fill material and thereby to close the lobes and to contain the weighing fill material;

d) positioning the pipeline weighting device above the pipeline, with the longitudinal axes of the pipeline weighting device and the pipeline being aligned, such that the plurality of lobes are balanced on the pipeline; and e) optionally fastening the pipeline weighting device to the pipeline.

The invention also broadly extends to a method of weighting a pipeline along its longitudinal axis, comprising:

a) providing a pipeline weighting device comprising a plurality of interconnected, generally tubular-shaped lobes, each lobe having an outer side wall, opposed and closed longitudinal side edges, and opposed ends, one end being a closed end, and the other end forming an open or partially open filling end; one or more fastening straps connected along the longitudinal side edge of an outermost lobe, and one or more buckle means connected to the outer side wall of a lobe which is opposite the outermost lobe to which the one or more fastening straps is connected; and the plurality of lobes being formed of a flexible, water permeable fabric to hold the weighting fill material;

b) charging the plurality of lobes with the weighting fill material through their open or partially open filling ends until each lobe includes a balanced, full charge of the weighting fill material, and closing the open or partially open filling end of each lobe;

c) positioning the pipeline weighting device above the pipeline, with the longitudinal axes of the pipeline weighting device and the pipeline being aligned, such that the plurality of lobes are balanced on the pipeline; and d) fastening the pipeline weighting device to the pipeline by threading the one or more fastening straps through the one or more buckle means.

As used herein and in the claims, a reference to "longitudinal", "centre", "side" etc. are terms meant to describe the pipeline weighting device when in place on the longitudinal axis of the pipeline, with side referring to a longitudinal edge, parallel to a longitudinal axis. The ends of the bag or lobe may be referred to as referring to the closed or open ends, being along the width, or transverse edge of the bag or lobe, unless the context otherwise requires. The ends are also sometime referred to as "top", "bottom", these being the positions when the bag is in an upright filling position. "Interior" refers to location within the inner side wall of the bag or lobe, and "exterior" refers to a location outside the bag or lobe, such as on an outer side wall.

BRIEF DESCRIPTION OF THE DRAWINGS

FIGS. 3-5 show the pipeline weight of this invention during progressive assembly stages, in which:

DESCRIPTION OF THE PREFERRED EMBODIMENTS

Figure 1:
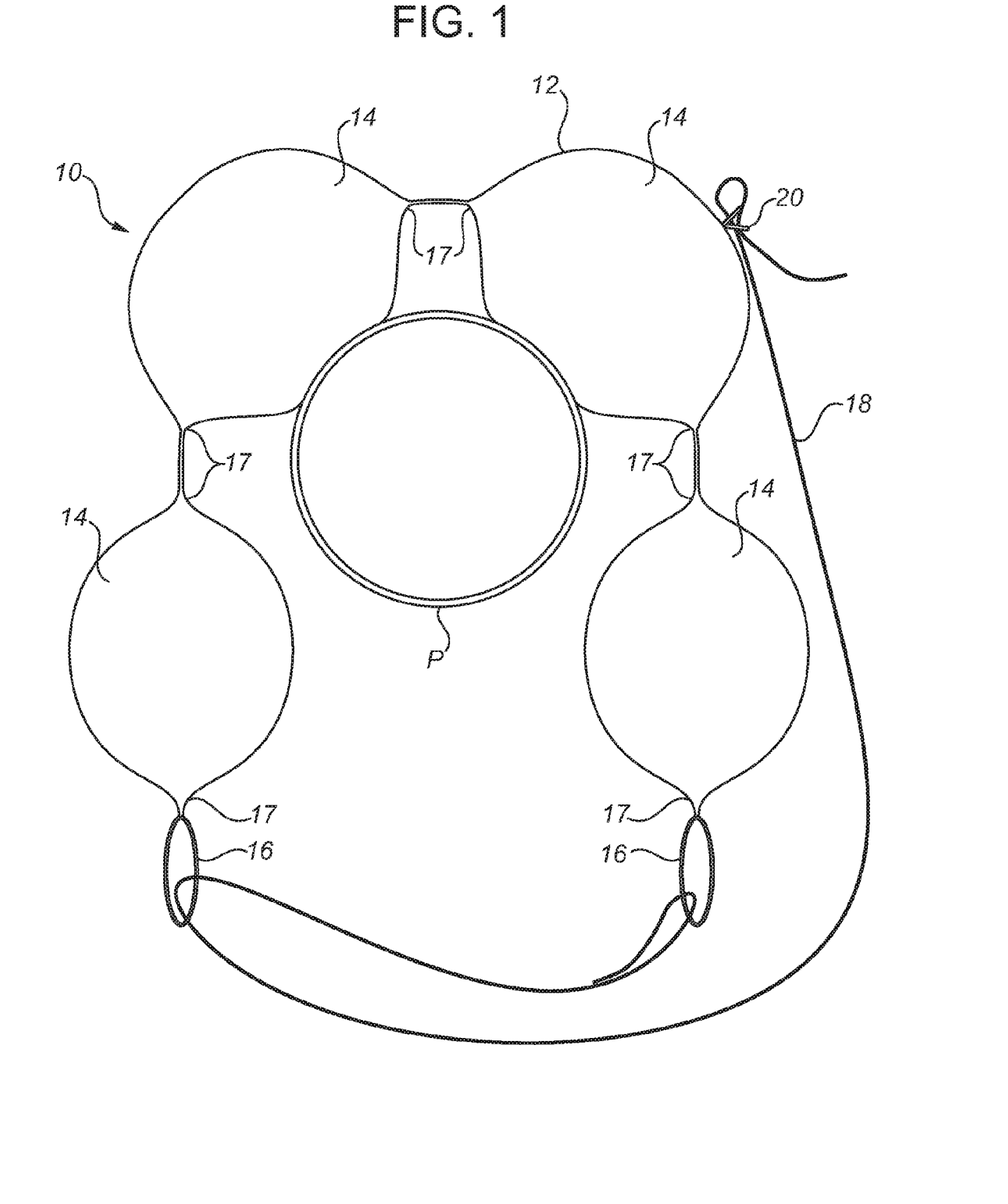
FIG. 1 is a schematic end view of a pipeline weighting device of the present invention shown on the pipeline (looking down the longitudinal axis of the pipeline from the closed end of the device), with the optional fastening straps.
Figure 2:
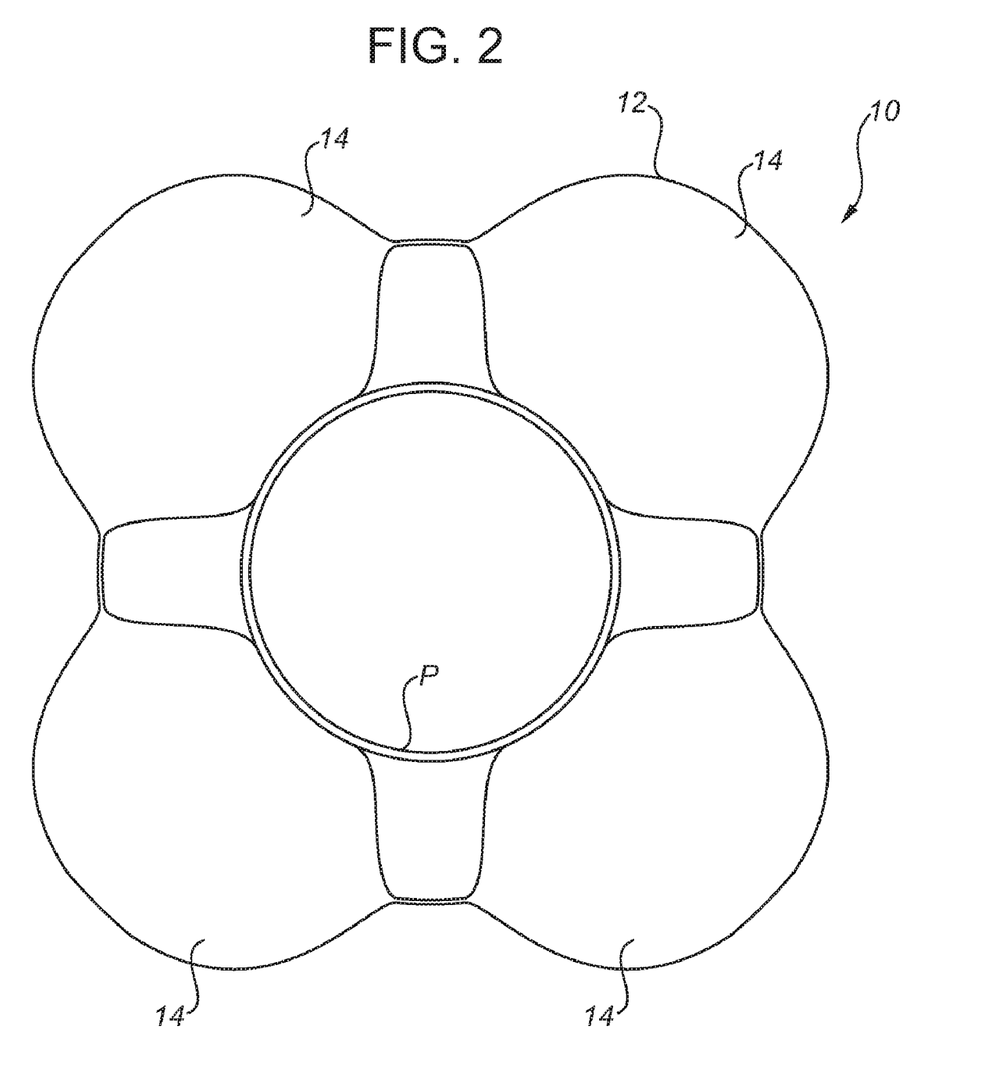
FIG. 2 is a schematic end view of a pipeline weighting of FIG. 1 when fastened to the pipeline in a preferred balanced position with four lobes being positioned symmetrically around the pipeline.

Having reference to FIG. 1, the pipeline weighting device 10 is shown in a balanced position on pipeline P, with a main bag 12 divided into a plurality (four shown) of symmetrical, generally tubular shaped lobes 14, to be arranged in a preferred and balanced position around the pipeline P. A plurality of lifting loops 16 are shown being formed along the longitudinal side edges 17 of the outermost lobes 14 (i.e., along a longitudinal axis). Optionally, one or more fastening straps 18 may be connected to the side edge 17 of one of the outermost lobes 14, for instance by threading through the lifting loops 16 or by stitching directly to the lobe 14. These fastening straps 18 may be used to fasten the weighting device 10 on the pipeline P. Optionally, one or more buckle means such as D-rings 20 may be provided on the outer side wall of the lobes 14, preferably to a lobe opposite the outermost lobe to which the fastening straps are connected, as shown in the figures. The fastening straps 18 may be threaded through the buckle means to retain the fastening straps 18, as shown in FIG. 1, in order to secure the weighting device 10 to the pipeline. Alternate strap and buckle means may be used to permit tightening and fastening through a buckle means. Exemplary alternatives include, without limitation, ratchets, cinches, buckles, slides, clips, rings such as D-rings or O-rings, cam lock sliders, tie downs and hooks. FIG. 2 shows another sectional view, not showing the straps 18 or lifting loops 16, but showing the preferred, symmetrical and balanced configuration of the weighting device 10 on the pipeline P.

The assembly of the device 10 from a fabric pattern is shown in one embodiment in FIGS. 3, 4 and 5, described below.

Assembly

Figure 3:
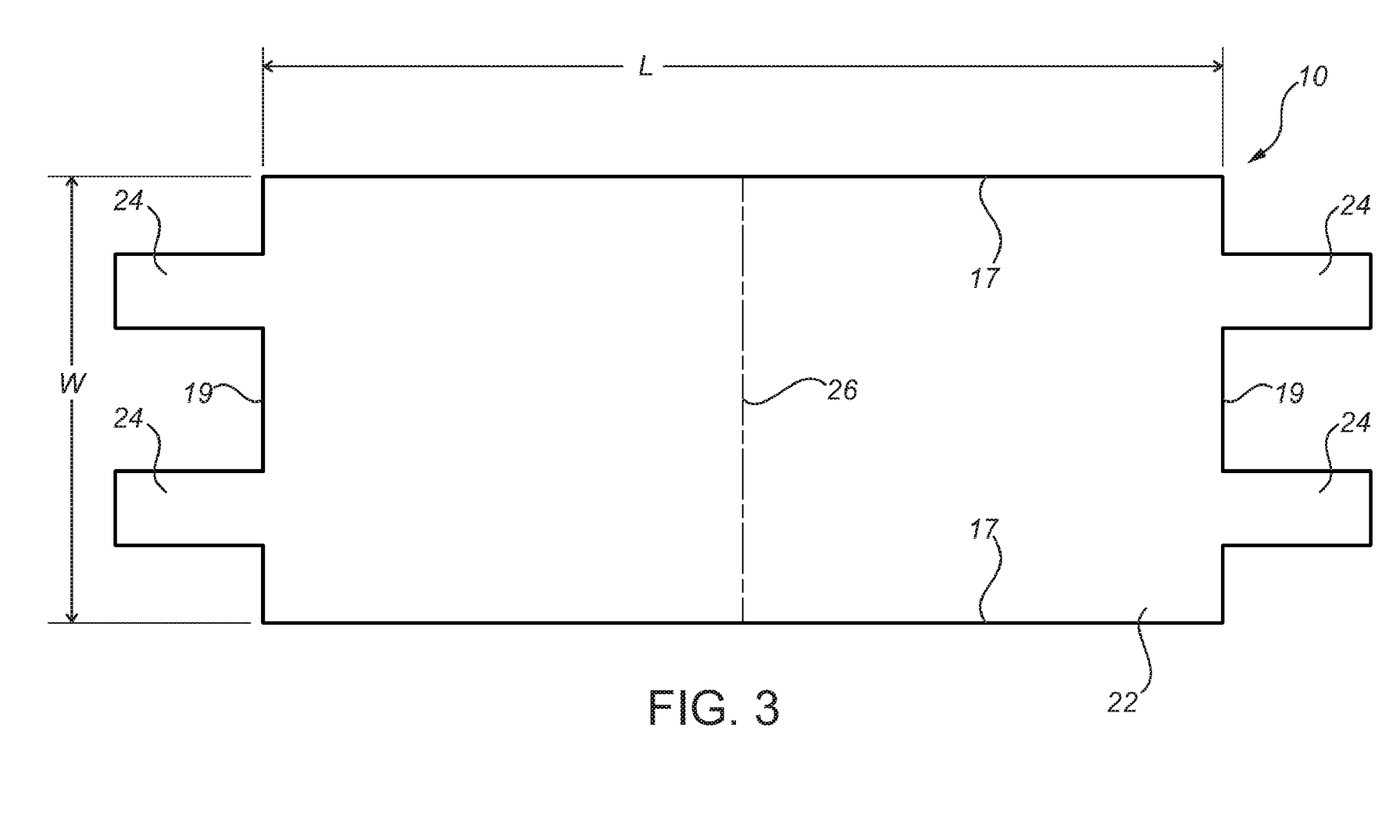
FIG. 3 is a top plan view showing the pipeline weight fabric pattern as a single web of geotextile fabric, prior to folding and sewing, with the dotted line indicating the center fold line.

An exemplary fabric pattern for a pipeline weighting device 10 is shown in FIG. 3, in its unassembled form with a main web 22, having a longitudinal length dimension L that is twice the desired finished length of the weighting device 10, and a transverse width dimension W that allows for at least two, and preferably four or more lobes 14 to be subdivided such that an even number of lobes 14 will lie in a balanced manner on the pipeline P in a balanced configuration (see FIGS. 1 and 2). Fill sleeves 24 extend from the transverse (width) ends 19 of the web 22. It will be understood that FIG. 3 shows only one possible fabric pattern, with other patterns being possible within the scope of this invention. For instance, the pattern could provide for folding along a longitudinal axis, such that the pattern had a width dimension twice the desired finished width. Still alternatively, the pattern could provide for two or more fabric sections to be stitched together to form the end device in a manner that will be evident to those skilled in the art.

The fill sleeves 24 are preferably located to be adjacent the longitudinal side edges 17 of the lobes 14 (to be subsequently formed). As shown in FIG. 3, the sleeves 24 are preferably located to straddle the side edges 17 of two adjacent lobes 14 to be subsequently formed.

It will be understood that an alternative to the filling sleeves 24 are filling flaps (not shown), which are arranged to extend into the interior of the lobes, adjacent the longitudinal side edges 17, in a manner so as to form openings to admit fill material into the lobes, but to become trapped within the fill material when the fully charged lobes are turned on the longitudinal axis of the device. Preferably, when a self-closing filling flap is included, it comprises a pair of facing filling flaps forming an opening into the lobe between the facing flaps. The facing flaps preferably have side edges which are at least partially joined to each other such as by stitching along part or all of their side edges.

Figure 4:
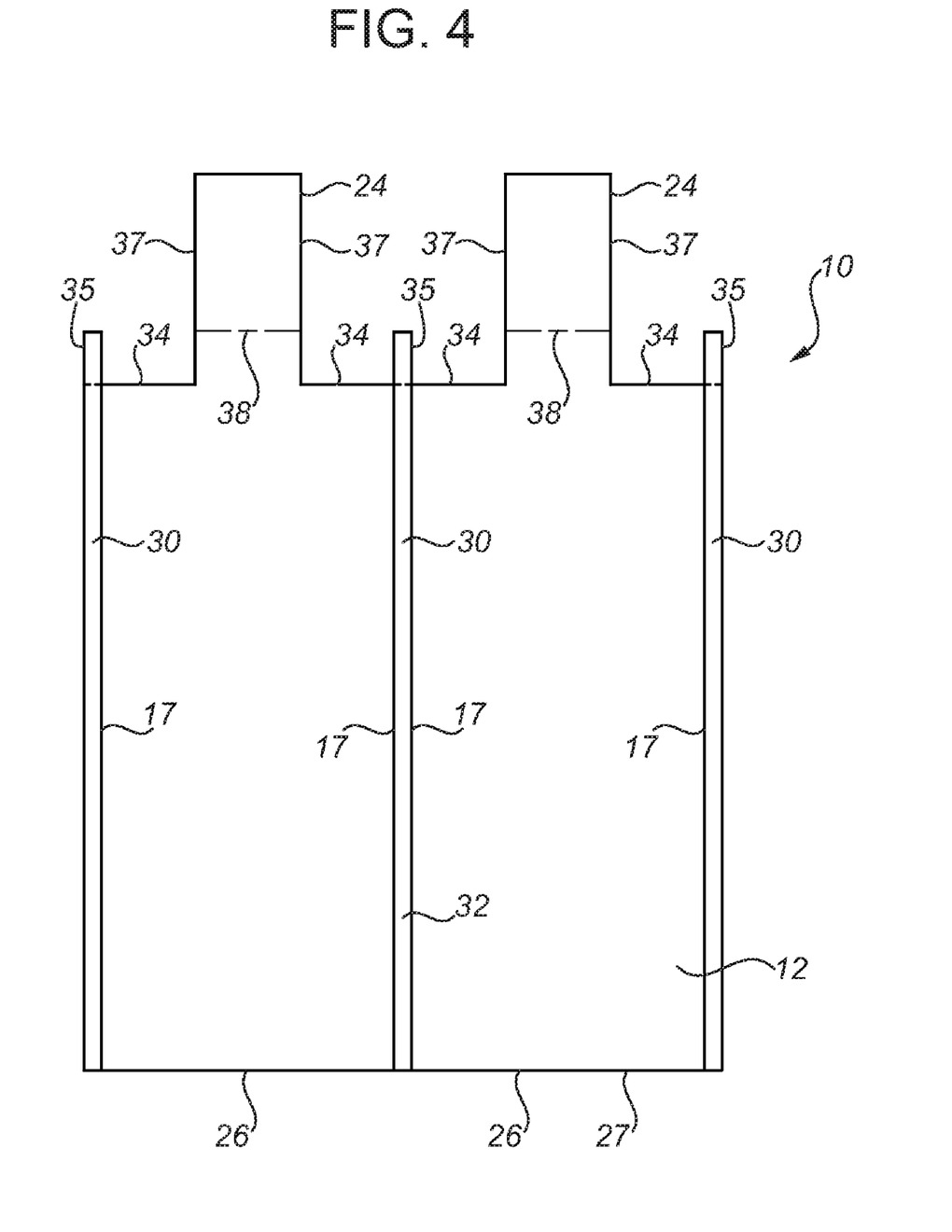
FIG. 4 is a top plan view showing the pipeline weight after folding on the center line, stitching the longitudinal side edges and fastening the longitudinal lifting straps.

The web 22 is folded lengthwise along fold line 26 to assume the shape shown in partially assembled view of FIG. 4. Alternatively, the web 22 could be formed in two identical sections which are stitched together to assume the shape shown in FIG. 4. The fold line 26, (or a stitched line in the case of two web sections) closes the end of the main bag 12 to form the closed ends 27 (bottom ends) of the lobes 14. In FIG. 4, the web 22 is stitched along its outermost longitudinal side edges 17 to close the sides of the main bag 12. In this assembly operation, flexible lifting straps 30 are preferably simultaneously stitched on both sides of the web 22, along the outermost and inner most longitudinal side edges 17. The main bag 12 is also stitched along its longitudinal centre line 32, preferably also simultaneously stitching a further flexible lifting strap 30 on both sides of the web 22 in this centre line of stitching. The flexible lifting straps 30 form or end in lifting loops 35 at the filling ends 34 to assist in the filling operation, as described below. The main bag 12 is further partially stitched along its filling end 34 (top end) between the filling sleeves 24 (such that openings into lobes 14 are through the filling sleeves 24). In this manner, the filling end 34 of the main bag 12, and of the lobes 14, are open or partially open, as provided for by the filling sleeves 24). The filling sleeves 24 are stitched along part or all of their side edges 37, and are then folded into the interior of the main bag 12, along the fold line 38. In this manner, the filling sleeves 24 form opposed open ends, namely an exterior open end 36a, generally contiguous with the filling end 34 of the bag 12, and an interior open end 36b interior of each lobe 14 (see FIG. 5).

Figure 5:
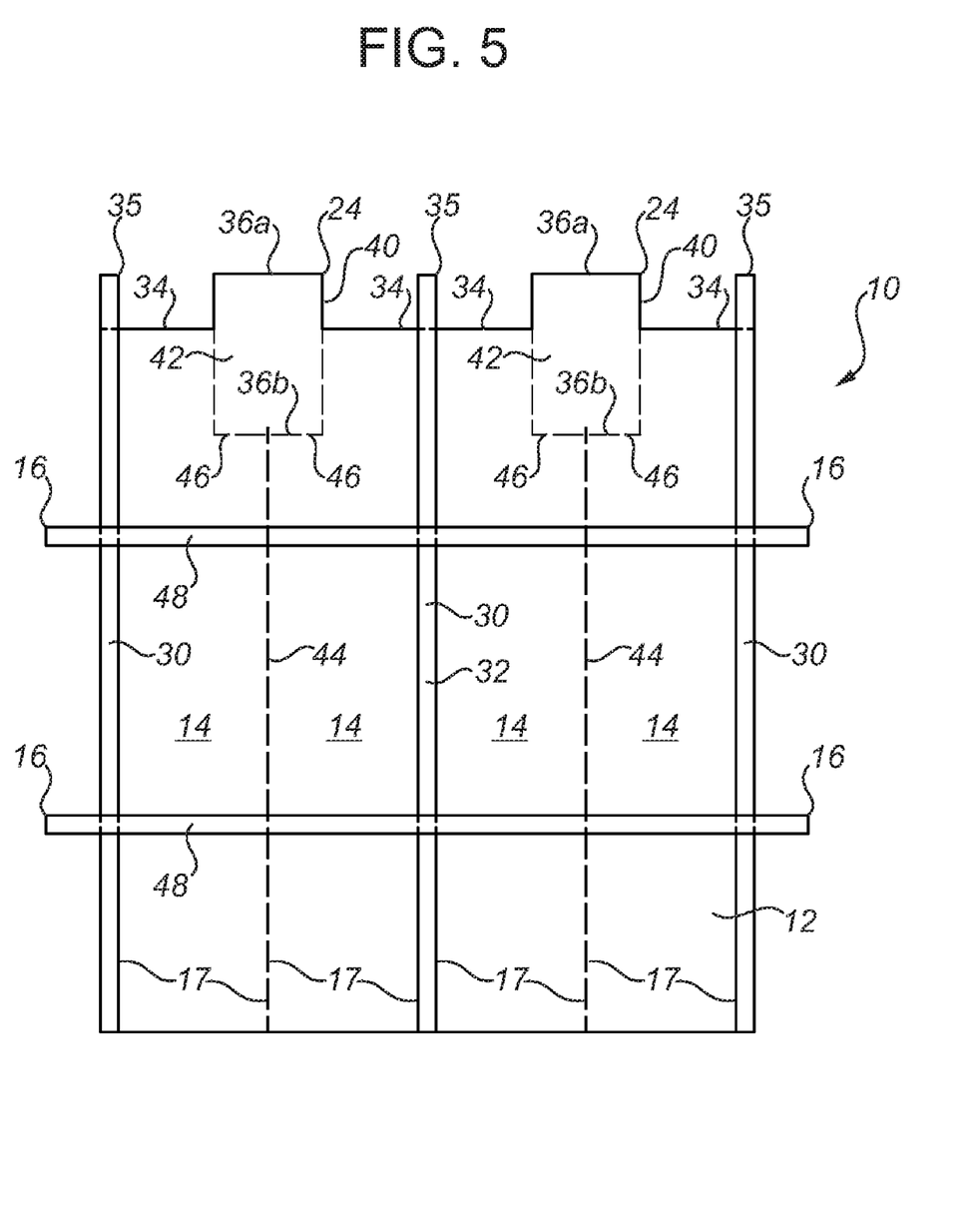
FIG. 5 is a top plan view showing the pipeline weight after stitching to divide into four lobes, fastening the transverse lifting straps, and forming the self-closing fill chutes at the filling ends.

The final steps in the assembly are shown in FIG. 5. The fill sleeves 24 are shown to include a chute portion 40 extending upwardly from the filling ends 34 of the bag 12. This filling chute portion 40 is sized to accept a filling tube or the like (not shown) of an overhead hopper (also not shown) during the later filling operation. Although the chute portion 40 is formed by folding the filling sleeve 24 along a fold line 38 located above the filling ends 34 of the main bag 12, it will be understood that the fold line 38 could be flush with the filling ends 34 of the main bag 12. In either embodiment, the exterior open ends 36a are generally contiguous with the filling end 34 of the main bag 12. An interior portion 42 of the filling sleeve 24 extends into the interior of the main bag 12. The main bag 12 is stitched along quarter lines 44 in order to sub-divide the main bag 12 into the preferred four symmetrical lobes 14. This stitching line along quarter lines 44 also preferably stitches through the interior open ends 36b of the filling sleeves 24, interior of the bag 12, such that the filling sleeves 24 are partitioned to provide openings 46 into each of the lobes 14. The stitching also serves to fix the filling sleeve 24 to the inner side wall of each lobe 14. The openings 46 are sized to allow fill material to freely flow into the lobes 14 during the filling operation. To provide adequate openings, the assembly may include stitching that extends only partly along the sides 37 of the filling sleeves 24, so the sleeve stitching ends before the ends that subsequently form the interior open ends 36b. Alternatively, the shape of the filling sleeve 24 might be flared at the open ends 36b, to increase the size of the openings 46.

Additional flexible lifting straps 48 are attached transversely across the main bag 12, with stitching at the intersections with the first set of lifting straps 30, and optionally at the intersections with the quarter lines 44. The flexible lifting straps 48 end in, form or connect to the lifting loops 16, as shown in FIG. 1.

To ensure that the filling sleeve 24 does become adequately trapped during filling, the filling sleeve 24 preferably extends into the interior of the bag by a distance that is greater than the width of the openings 46 formed at the interior open ends 36b of the sleeves. This ensures that when the sleeve 24 becomes trapped in the fill material during and after filling, there is adequate fabric in the collapsed sleeve to cover and thus close the openings 46 at the open end 36a.

It should be understood that the lifting straps 30 and 48 serve to reinforce the main bag 12 in both the longitudinal and transverse directions, and are thus also termed reinforcing straps. These straps 30, 48 also serve to form or connect to the lifting loops 35, 16 at their ends in a manner to prevent tearing or straining of the lobes 14 of the weighting device 10, once filled with fill material. Smaller bags have a lesser need for the lifting straps 30, 48.

It should also be understood that the fastening straps 18 and D-rings 20 are optional, particularly for very large, heavy bags, which remain balanced on the pipeline P due to their weight factor. Also, other fastening strap embodiments will be evident to one skilled in the art, such as mentioned above, within the scope of the present claims.

Filling Operation

During the filling operation, the main bag 12 is lifted, for example by a fork lift device, by the lifting loops 35 (also termed first lifting loops) to position the chute portions 40 of the filling sleeves 24 below the fill tubes or nozzles (not shown) of an overhead hopper (not shown) filled with weighting fill material (not shown). As the fill material enters each of the lobes 14 through the openings 46 of the filling sleeves 24, it is divided between the adjacent lobes 14. Once the lobes 14 are fully charged with fill material, the fill tubes or nozzles are removed. The main bag 12, and lobes 14 are turned along their longitudinal axis, by lifting the filled bag 12 by the lifting loops 16 (also termed second lifting loops), or by the transverse straps 48. This rotation of the bag 12 on its longitudinal axis shifts the fill material within the lobes 14 in a manner so as to collapse and trap the fill sleeves 24, preventing the fill material from escaping from the bag 12 and lobes 14. In this manner, the bags 12 of the present invention are self-closing, and also self-sealing.

The filling sleeves 24 of the preferred embodiment of this invention have been found to work particularly well in self-closing, as fill material wedges itself between the inner side wall of the lobes 14 and the outer wall of the filling sleeve, causing the sleeve 24 to substantially self-close on itself even during the filling operation. This self-closing action might be envisioned as the collapsing action of a inner flexible sleeve within an outer concentric tubular as the annulus between the sleeve and outer tubular is filled with fill material.

Pipeline Placement

The filled pipeline weighting device 10 is lifted, for example by the lifting loops 16, or the transverse straps 48. A fork lift or crane (not shown) is used to lift the heavier bags. The bag 12 is moved alongside the pipeline P. The weighting device 10 is placed longitudinally along the pipeline, with the centre line 32 along the top center of the pipeline, so as to balance an equal number of lobes 14 on and around the pipeline (as shown in FIGS. 1 and 2). While the weight of the weighting device 10 itself is often sufficient to secure the device 10 to the pipeline P, optional fastening straps 18 might be threaded through the lifting loops 16 to fasten more securely to the pipeline P. As described above, particularly for smaller, lighter weight bags 12, optional D-rings 20 might be located on the lobes 14 to accept and retain the fastening straps 18, in a more secure cinching manner.

The number of lobes 14 in the pipeline weighting device 10 can vary, with an even number being preferred to balance around the pipeline P. Most preferred are four symmetrical lobes 14, as shown above. However, any other even number such as two, six or eight, may be used with a balanced effect. Alternatively, the lobes 14 might be formed asymmetrically, such that one lobe is positioned on top of the pipeline, with an equal number of side lobes extending down the sides of the pipeline in a balanced manner. This configuration is less preferred than shown in the Figures however, since the trench to contain the weighted pipeline might need to be deeper.

While the preferred embodiment includes lobes 14 equally divided from a main bag with stitching, thus forming lobes which are directly connected to each other, and closed, along their longitudinal edges, it should be understood that connecting webs (not shown) might be included between adjacent lobes. For example, a connecting web might be formed between two sets of side lobes, such that the connecting web overlies the top of the pipeline. It is believed that the embodiment of the Figures is preferable over these alternate configurations in order to best minimize any excessive height or depth which the lobes add to the weighted pipeline, so as to minimize any extra trench depth that is needed to contain the weighted pipeline. If additional weight is needed, rather than add extra lobes which will hang well below the bottom of the pipeline, it may be preferable to fasten extra side lobes to the main bag 12, for example by stitching the extra lobes along quarter lines 44. This adds extra width and weight to the weighted pipeline, without extending the height or depth of the weighted pipeline.

Stitching is preferred to divide the main bag 12 into symmetrical lobes 14. However, gluing and/or thermal welding might be used, particularly for smaller bags. The device might include interconnected lobes which are formed separately, and then connected together, for example by stitching. The stitching is done with heavy weight thread, having tensile strength at least as strong as the straps and fabric being used, to prevent tearing or breakage.

Flexible fabric used to make the bags may be woven or non-woven fabric of sufficient strength to contain the fill material. Preferred fabrics include woven or non-woven geotextile fabrics such as polypropylene, with woven polypropylene being most preferred. A fabric weight of 200 g/m² is exemplary (for example 4516 non-woven polypropylene geotextile). The lifting straps and lifting loops may be formed of suitably strong industrial strapping materials. Preferred is woven polypropylene, such as 5000 lb/in wide straps. Heavy thread and double (or more) stitching is preferred, using thread which is preferably higher tensile strength than the straps.

It will be understood that, particularly for larger, heavier weighting devices, the bag 12 may be formed as a multiwalled bag, for example by starting from multiple webs 22, one on top of another.

One example of suitable dimensions will serve to exemplify the invention. For a 10 inch diameter pipeline, a four lobe pipeline weighting device can be constructed with dimensions of 6 ft×6 ft (length and width dimensions, not filled), to provide a filled weight of about 1100 lb. This produces a pipeline weight which, once placed in a balanced position straddling the pipeline, extends about 7 inches above the pipeline, and 7 inches below the pipeline. While the dimensions may vary, it should be understood that larger lobes, or a greater number of lobes can increase the size of the pipeline weight extending above or below the pipeline itself, increasing the size of the trench needed to bury the weighted pipeline.

Ballast material or fill material includes weight enhancing materials including, without limitation, crushed rock, cement, aggregate, barite or other ores. Dirty aggregate, river rock and sand are less preferred as filling with such materials is more difficult, with clogging being possible.

It will be understood that all of the above-mentioned alternatives, including other alternatives evident to those skilled in the art, are included within the scope of the claims.

Advantages:

Some of the advantages provided by the present invention include:

1. The filling and closing of the weighting device are less labour-intensive, saving time and expense in these operations, and reducing the overall cost of a weighted pipeline with the device of the present invention.
2. The filling and closing operations, as well as the pipeline installation operation are simpler, reducing the likelihood of injury to workers.
3. End filling of the bags is more convenient than open topped bags, lessening spillage and injury to workers thereby.
4. The self-closing and self-sealing filling sleeves lead to reduced spillage, improved dust control.
5. The lifting straps are simple to attach in the fabrication of the device, and offer excellent reinforcement to the bag, with convenient location of the lifting loops.
6. The weighting device can be simply formed from a single web of geotextile fabric in an inexpensive and economical manner.
7. In its preferred embodiment, with equal, even number of lobes (most preferably four symmetrical lobes), the weighting device can be balanced (i.e., with weight equally distributed) around the pipeline, and the depth of the trench needed to contain the pipeline is minimized.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

As used herein, "comprising" is synonymous with "including," "containing," or "characterized by," and is inclusive or open-ended and does not exclude additional, unrecited elements. The use of the indefinite article "a" in the claims before an element means that one or more of the elements is specified, but does not specifically exclude others of the elements being present, unless the contrary clearly requires that there be one and only one of the elements.

We claim:

1. A pipeline weighting device for straddling a longitudinal axis of a pipeline, comprising:
    a plurality of interconnected, generally tubular-shaped lobes arranged to straddle the pipeline in a balanced manner along the longitudinal axis of the pipeline;
    each of the lobes having an inner side wall interior of the lobe, opposed and closed longitudinal side edges, and opposed ends, one end being a closed end, and the other end forming an open or partially open filling end;
    the plurality of lobes being formed of a flexible, water permeable fabric to hold a weighting fill material; and
    each of the lobes being formed with a self-closing filling flap at the open or partially open filling end, the filling flap extending into an interior of the lobe and being fixed to the inner side wall of the lobe to provide an opening into the lobe within the interior of the lobe such that, when each of the lobes is fully charged through the opening with the fill material, and the pipeline weighting device is turned on its longitudinal axis, the filling flap becomes trapped within the fill material to close the lobe and to contain the fill material.

2. The pipeline weighting device of claim 1, wherein the filling flap is formed of the flexible, water permeable fabric and is contiguous with the lobe.

3. The pipeline weighting device of claim 2, wherein the filling flap comprises a pair of facing filling flaps have facing side edges which are fastened together along all or part of a length of the facing side edges.

4. The pipeline weighting device of claim 3, wherein the facing side edges are fastened together by stitching.

5. The pipeline weighting device of claim 4, wherein the pair of facing filling flaps extends into the interior of adjacent lobes in order to fill the adjacent lobes in one filling operation.

6. The pipeline weighting device of claim 5, wherein the pair of facing filling flaps is formed between two adjacent lobes such that a portion of the facing filling flaps extends into the interior of the two adjacent lobes.

7. The pipeline weighting device of claim 2, wherein:
the filling flap comprises a filling sleeve having side edges which are fastened together along all or part of a length of the side edges of the filling sleeve, and which is folded to extend into the interior of the lobe so as to form opposed open sleeve ends, one open sleeve end being an exterior open sleeve end at or adjacent the filling end of the lobe, and the other open sleeve end being an interior open sleeve end which forms the opening into the lobe.

8. The pipeline weighting device of claim 7, wherein one filling sleeve extends into the interior of adjacent lobes in order to fill the adjacent lobes in one filling operation.

9. The pipeline weighting device of claim 8, wherein the one filling sleeve is formed between two adjacent lobes such that a portion of the one filling sleeve extends into the interior of the two adjacent lobes and is partitioned to form the interior open sleeve end which forms the opening into the two adjacent lobes.

10. The pipeline weighting device of claim 9, wherein the plurality of lobes are formed from a web of the flexible, water permeable fabric, stitched along a longitudinal axis of the web to form the plurality of lobes arranged in side by side relationship, each of the plurality of lobes being generally equal in size, the closed side edges and closed ends of each lobe being formed by one or both of folding and stitching of the web, and the filling sleeve being stitched to both fix the filling sleeve to the inner side wall of the lobe and to partition the filling sleeve to form the interior open sleeve ends into the two adjacent lobes.

11. The pipeline weighting device of claim 10, wherein there are an even number of lobes to balance on the pipeline and to form pairs of adjacent lobes, and wherein there is one filling sleeve arranged to fill each of the pairs of adjacent lobes.

12. The pipeline weighting device of claim 11, wherein the web includes the filling sleeves being formed integral with the lobes, the filling sleeves being formed by stitching along all or part of the side edges of the filling sleeves, and folding into the interior of the lobes.

13. The pipeline weighting device of claim 12, wherein each of the filling sleeves has dimensions such that the filling sleeve extends into the interior of the lobe by a distance which is greater than the width of the opening formed at the interior open sleeve end of the filling sleeve.

14. The pipeline weighting device of claim 13, wherein the filling sleeve is generally tubular in shape, forming a chute portion protruding above the lobes to accept a filling chute in order to charge with the fill material.

15. The pipeline weighting device of claim 13, which further comprises a plurality of first lifting loops connected at the filling end of the lobes, for lifting the weighting device during charging.

16. The pipeline weighting device of claim 15, which further comprises a plurality of second lifting loops connected along the longitudinal side edges of one of the lobes, for lifting the filled weighting device into position to straddle the pipeline.

17. The pipeline weighting device of claim 16, which further comprises a plurality of first reinforcing straps stitched longitudinally along the stitching lines forming the lobes, and ending in loops which form the first lifting loops.

18. The pipeline weighting device of claim 17, which further comprises a plurality of second reinforcing straps stitched transversely across the lobes, and ending in loops which form the second lifting loops.

19. The pipeline weighting device of claim 18, wherein the plurality of lobes and filling sleeves are formed from a single web of the flexible, water permeable fabric.

20. The pipeline weighting device of claim 19, wherein the flexible, water permeable fabric is woven or non-woven geotextile fabric.

21. The pipeline weighting device of claim 20, wherein the flexible, water permeable fabric is woven polypropylene.

22. The pipeline weighting device of claim 21, wherein the first and second reinforcing straps are formed of a woven or non-woven geotextile strapping material.

23. The pipeline weighting device of claim 22, wherein the first and second flexible straps are formed of woven polypropylene strapping material.

24. The pipeline weighting device of claim 23, which further comprises one or more fastening straps connected to one or more of the lobes to hold the weighting device on the pipeline.

25. The pipeline weighting device of claim 24, wherein the one or more fastening straps are threaded through the second lifting loops and are retained by one or more D-rings connected to a side of one or more of the lobes.

26. The pipeline weighting device of claim 25, comprising four lobes arranged side by side.

27. A method of filling a pipeline weighting device with a weighting fill material, comprising:
a) providing the pipeline weighting device comprising a plurality of interconnected, generally tubular-shaped lobes, each of the lobes having an inner side wall interior of the lobe, opposed and closed longitudinal side edges and opposed ends, one end being a closed end, and the other end forming an open or partially open filling end, the plurality of lobes being formed of a flexible, water permeable fabric to hold the weighting fill material, and each of the lobes being formed with a self-closing filling flap at the open or partially open filling end, the filling flap extending into an interior of the lobe and being fixed to the inner side wall of the lobe to provide an opening into the lobe within the interior of the lobe;
b) charging the plurality of lobes through the opening formed by the filling flap with the weighting fill material until each lobe includes a balanced, full charge of the weighting fill material; and
c) turning the pipeline weighting device on its longitudinal axis to cause the filling flaps to become trapped within the weighting fill material to close the lobe and to contain the weighting fill material.

28. The method of claim 27, wherein the filling flap comprises a filling sleeve having side edges which are fastened together along all or part of a length of the side edges, and which is folded to extend into the interior of the lobe so as to form opposed open sleeve ends, one open sleeve end being an exterior open sleeve end at or adjacent the filling end of the lobe, and the other open sleeve end being an interior open sleeve end which forms the opening into the lobe, and wherein the lobes are formed with one filling sleeve being formed between two adjacent lobes such that the one filling sleeve extends into the interior of the two adjacent lobes and is partitioned to form an interior open sleeve end which forms the opening into the two adjacent lobes, and wherein the two adjacent lobes are filled through the one filling sleeve.

29. A method of weighting a pipeline along a longitudinal axis of the pipeline, comprising:
   a) providing a pipeline weighting device comprising a plurality of interconnected, generally tubular-shaped lobes, each of the lobes having an inner side wall interior of the lobe, opposed and closed longitudinal side edges and opposed ends, one end being a closed end, and the other end forming an open or partially open filling end, the plurality of lobes being formed of a flexible, water permeable fabric to hold a weighting fill material, and each of the lobes being formed with a self-closing filling flap at the open or partially open filling end, the filling flap extending into an interior of the lobe and being fixed to the inner side wall of the lobe to provide an opening into the lobe within the interior of the lobe;
   b) charging the plurality of lobes through the opening formed by the filling flap with the weighting fill material until each lobe includes a balanced, full charge of the weighting fill material;
   c) lifting the pipeline weighting device and turning it on its longitudinal axis to cause the filling flap to become trapped within the weighting fill material and to close the lobes and to contain the weighting fill material;
   d) positioning the pipeline weighting device above the pipeline, with the longitudinal axes of the pipeline weighting device and the pipeline being aligned, such that the plurality of lobes are balanced on the pipeline; and
   e) optionally fastening the pipeline weighting device to the pipeline.

30. The method of claim 29, wherein the filling flap comprises a filling sleeve having side edges which are fastened together along all or part of the length of the side edges, and which is folded to extend into the interior of the lobe so as to form opposed open sleeve ends, one open sleeve end being an exterior open sleeve end at or adjacent the filling end of the lobe, and the other open sleeve end being an interior open sleeve end which forms the opening into the lobe, and wherein the lobes are formed with one filling sleeve being formed between two adjacent lobes such that the one filling sleeve extends into the interior of the two adjacent lobes and is partitioned to form the interior open sleeve end which forms the opening into the two adjacent lobes, and wherein the two adjacent lobes are filled through the one filling sleeve.

* * * * *